United States Patent
Hsiao et al.

(10) Patent No.: US 6,944,937 B2
(45) Date of Patent: Sep. 20, 2005

(54) METHOD OF REDUCING ESD DAMAGE IN THIN FILM READ HEADS WHICH ENABLES MEASUREMENT OF GAP RESISTANCE

(75) Inventors: Richard Hsiao, San Jose, CA (US); James D. Jarratt, San Jose, CA (US); Emo Hilbrand Klaassen, Santa Clara, CA (US); Ian Robson McFadyen, San Jose, CA (US); Timothy J. Moran, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 120 days.

(21) Appl. No.: 10/611,623

(22) Filed: Jun. 30, 2003

(65) Prior Publication Data

US 2004/0090715 A1 May 13, 2004

Related U.S. Application Data (62) Division of application No. 09/753,804, filed on Jan. 2, 2001, now Pat. No. 6,678,127.

(51) Int. Cl.[7] ............................ G11B 5/127; H04R 31/00
(52) U.S. Cl. ........................ 29/603.09; 29/603.07; 29/603.11; 29/603.13; 29/603.14; 29/605; 29/606; 29/609; 324/309; 324/314; 324/318; 324/322; 324/525; 324/526; 324/528; 360/313; 360/319; 360/321; 360/322; 360/323; 360/324; 427/127; 427/128; 451/5; 451/41

(58) Field of Search ............... 29/603.07, 603.09, 29/603.11, 603.13, 603, 603.18, 605, 606, 609, 603.15; 324/309–314, 31, 322, 525, 526, 528, 318; 360/313, 319, 321–324; 427/127, 128; 451/5, 41

(56) References Cited

U.S. PATENT DOCUMENTS

| | | | | |
|---|---|---|---|---|
| 5,208,535 A | * | 5/1993 | Nakayama et al. | 324/318 |
| 6,221,559 B1 | * | 4/2001 | Lee et al. | 430/311 |
| 6,246,553 B1 | * | 6/2001 | Biskeborn | 360/323 |
| 6,570,391 B2 | * | 5/2003 | Liang Lim et al. | 324/525 |

FOREIGN PATENT DOCUMENTS

| JP | 08061955 A | * | 3/1996 | G01C/17/32 |
|---|---|---|---|---|

OTHER PUBLICATIONS

"Study of magnetic tunnel junction read sensors" Ho, M.K.; Tsang, C.H.; Fontana, R.E., Jr.; Parkin, S.S.; Carey, K.J.; Tao Pan; MacDonald, S.; Arnett, P.C.; Moore, J.O.; IEEE Transactions on , vol. : 37 , issue:4 , Jul. 2001 pp.: 1691–1694.*

* cited by examiner

*Primary Examiner*—A. Dexter Tugbang
*Assistant Examiner*—Paul D Kim
(74) *Attorney, Agent, or Firm*—Zilka-Kotab, PC (57) ABSTRACT

The present invention provides a method of manufacturing a magnetoresistive read head which reduces electrostatic discharge and allows measurement of gap resistances in the head.

23 Claims, 9 Drawing Sheets

FIG. 11
(ABS)

METHOD OF REDUCING ESD DAMAGE IN THIN FILM READ HEADS WHICH ENABLES MEASUREMENT OF GAP RESISTANCE

This is a division of application Ser. No. 09/753,804 filed Jan. 2, 2001, now U.S. Pat. No. 6,678,127.

BACKGROUND OF THE INVENTION

1. Field of the Invention

The present invention relates to a device for reducing electrostatic discharge (ESD) damage in thin film read heads which enables measurement of gap resistances and, more particularly, to such a device and method wherein the resistance of first and second gap layers can be measured in parallel or the resistance of each of the first and second gap layers can be measured separately.

2. Description of the Related Art

The heart of a computer is a magnetic disk drive which includes a rotating magnetic disk, a slider that has read and write heads, a suspension arm above the rotating disk and an actuator arm that swings the suspension arm to place the read and write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

An exemplary high performance GMR read head employs a spin valve sensor for sensing the magnetic field signals from the rotating magnetic disk. First and second leads are connected to the spin valve sensor for conducting a sense current therethrough. The sensor and the first and second leads are located between first and second dielectric read gap layers which are, in turn, located between ferromagnetic first and second shield layers. Accordingly, the GMR head is electrically isolated from the two shields by the first and second gap layers which are typically aluminum oxide ($Al_2O_3$). The gap length, which is the distance between the shield layers, is continually being shortened in order to achieve higher areal density. For a given sensor thickness, therefore, the gap layers have to become thinner. In head designs, the shields are typically not electrically connected to any other conductors on the slider, and are electrically isolated from each other. As a result, a charge may accumulate on the shields during processing. The presence of this charge causes a potential difference across the gap layers. When this voltage reaches a sufficiently high value, the dielectric breaks down, and electrical shorts can occur at the location of the breakdown. This is a type of electrostatic discharge (ESD) damage. Shorts between the sensor and the shields are detrimental to the operation of the head. A typical specification on the resistance between the shields and the sensor is 100 kOhms. Accordingly, any head with a resistance less than 100 kOhms between the read sensor and either shield fails such a test. Losses at wafer final test due to shield shorts can be as high as 30%. One way to prevent the charging of the shields is to electrically short both shields to one side of the sensor via a lead and then remove the short during slider fabrication. While this will provide protection against process-induced charging, it does not allow the ability to test for shield shorts due to other phenomena, such as pinholes in the gap dielectric.

SUMMARY OF THE INVENTION

The present invention provides a device and method of reducing ESD damage to the sensor of the read head while enabling measurement of the first and second gap resistances. The first read gap layer can be considered to have a resistance $R_{G1}$ between the first shield layer and one of the first and second lead layers and the second read gap layer can be considered to have a resistance $R_{G2}$ between the second shield layer and one of the first and second lead layers. A short is provided via a plurality of resistors between a first node and each of the first and second shield layers wherein the plurality of resistors includes at least first and second resistors $R_{S1}$ and $R_{S2}$ and the first node is connected to either one of the first and second leads. A second node is located between the first and second resistors $R_{S1}$ and $R_{S2}$. An operational amplifier has first and second inputs connected to the first and second nodes respectively so as to be across the first resistor $R_{S1}$ and has an output connected to the first node for maintaining the first and second nodes at a common voltage potential.

In one embodiment of the invention the first and second shield layers are shorted together. In this embodiment a test instrument can be employed for determining the combined parallel resistance of the first and second gap layers by having a first side of the test instrument connected to the first node and a second side connected to each of the first and second shield layers. In another embodiment of the invention the second resistor $R_{S2}$ is connected between the second node and the shield layer and a third resistor $R_{S3}$ is connected between the second node and the first shield layer. In this embodiment the test instrument has a first side connected to the first node and a second side connected to the first shield layer for determining the resistance of the first gap layer separately. Alternatively, the test instrument can be employed with its first side connected to the first node and its second side connected to the second shield layer so that the resistance of the second gap layer can be determined separately. In another aspect of the invention the sensor and the resistors $R_{S1}$ and $R_{S2}$ or $R_{S1}$, $R_{S2}$ and $R_{S3}$ are coplanar. This is accomplished by forming a layer of sensor material on a wafer and then patterning the layer of material to individually form the sensor and each of the resistors. The formation of the sensor material layer can be by sputter deposition and the patterning may be accomplished by photolithography.

An object of the present invention is to reduce ESD damage to the sensor of a read head while enabling measurement of gap resistances in parallel of separately.

Another object is to accomplish the foregoing object with the sensor and a plurality of resistors patterned from a common material layer wherein the plurality of resistors are in parallel with the resistances of the first and second gap layers.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
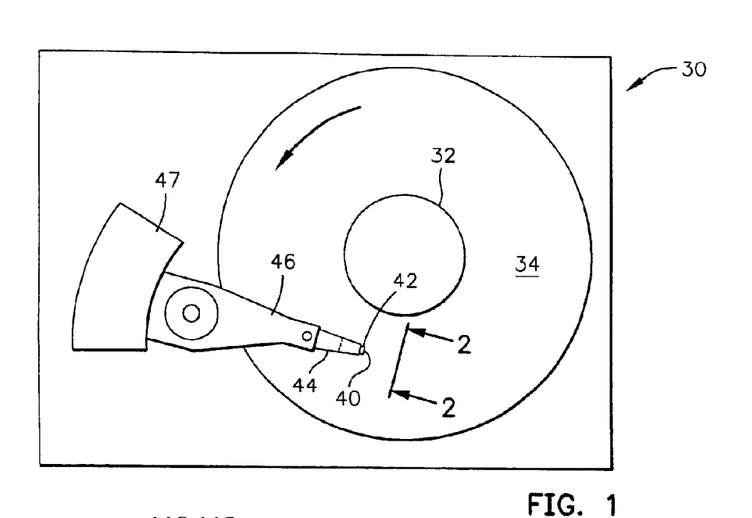
FIG. 1 is a plan view of an exemplary magnetic disk drive.
Figure 2:
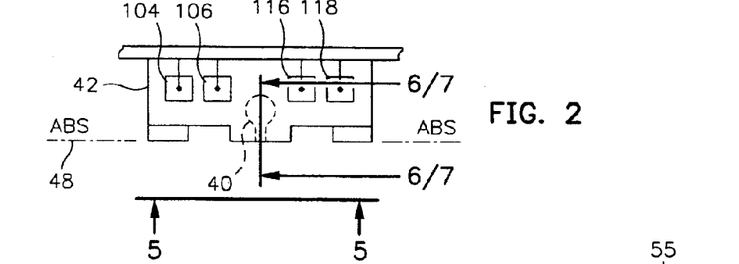
FIG. 2 is an end view of a slider with a magnetic head of the disk drive as seen in plane 2—2 of FIG. 1.
Figure 3:
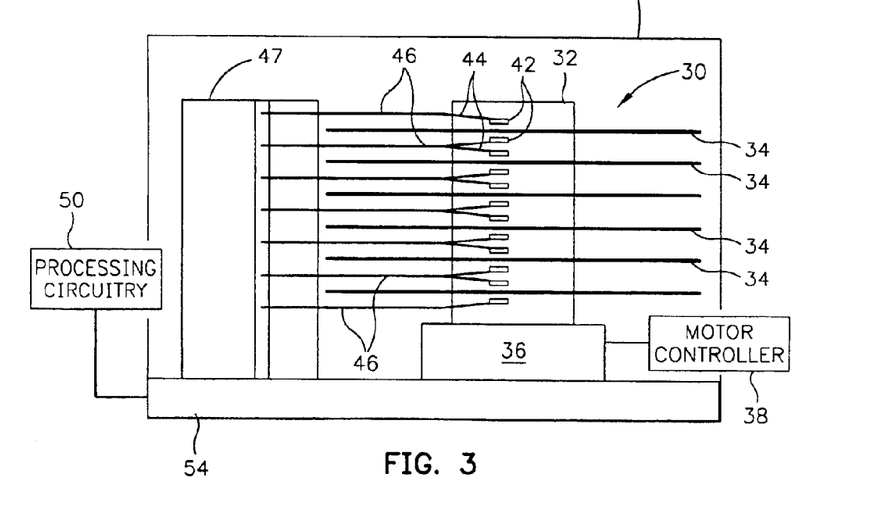
FIG. 3 is an elevation view of the magnetic disk drive wherein multiple disks and magnetic heads are employed.
Figure 4:
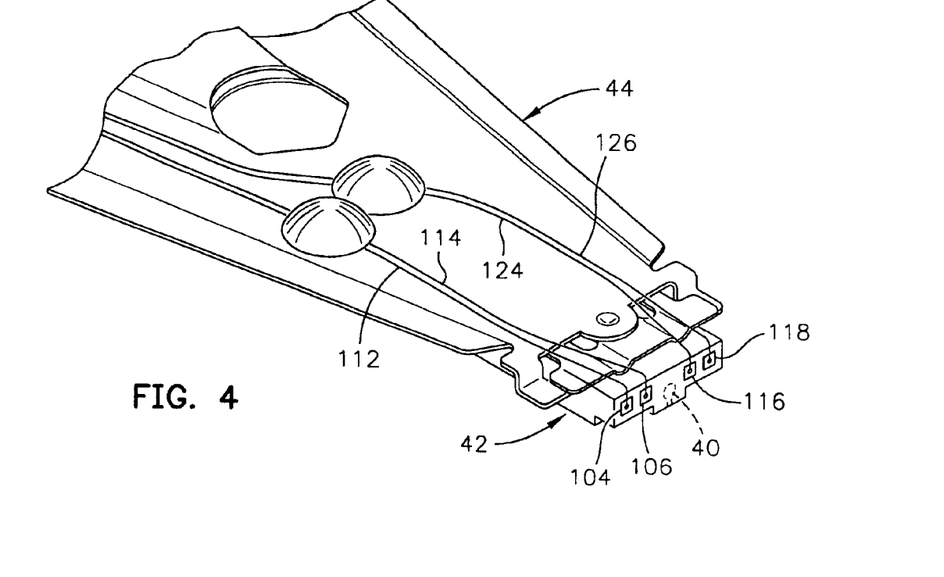
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
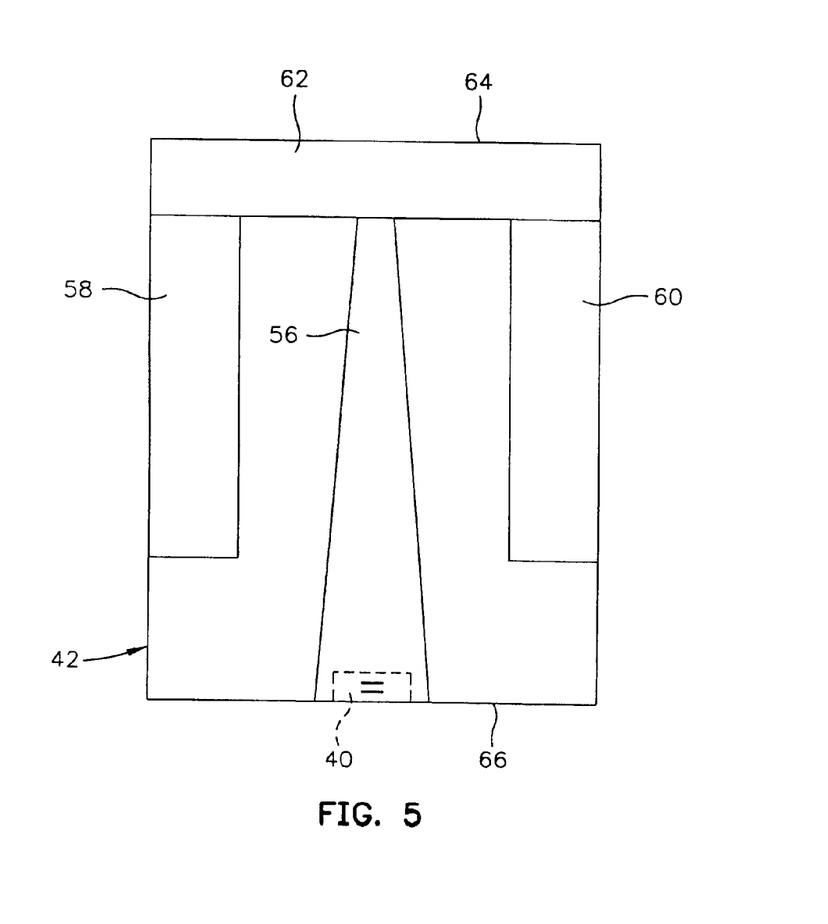
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
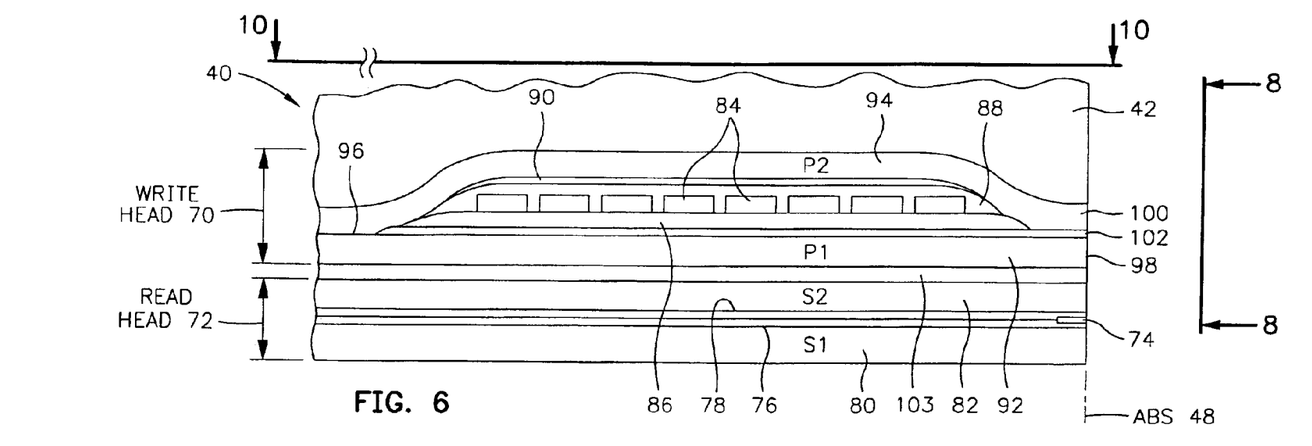
FIG. 6 is a partial view of the slider and a piggyback magnetic head as seen in plane 6—6 of FIG. 2.
Figure 8:
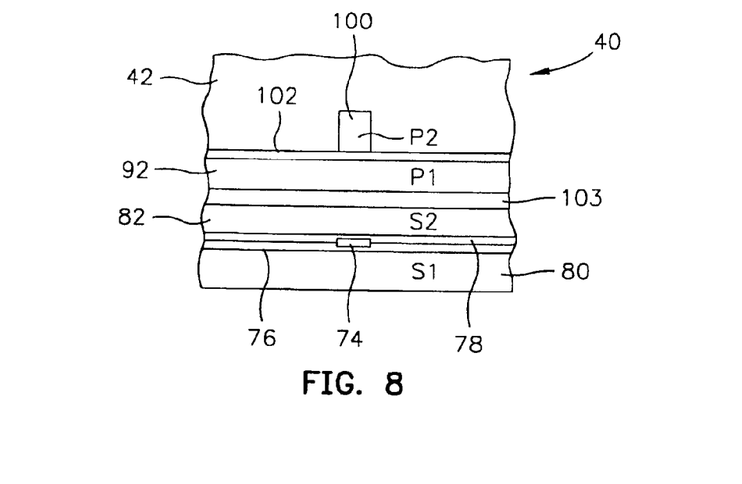
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a sensor 74. FIG. 8 is an ABS view of FIG. 6. The sensor 74 is sandwiched between nonmagnetic electrically insulative first and second read gap layers. 76 and 78, and the read gap layers are sandwiched between ferromagnetic first and second shield layers 80 and 82. In response to external magnetic fields, the resistance of the sensor 74 changes. A sense current $I_S$ conducted through the sensor causes these resistance changes to be manifested as potential changes. These potential changes are then processed as readback signals by the processing circuitry 50 shown in FIG. 3.

Figure 10:
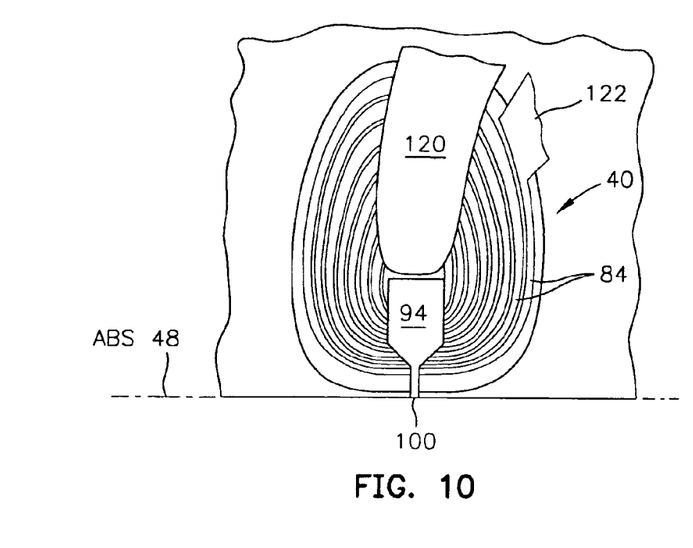
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the sensor 74 to leads 112 and 114 on the suspension 44, and third and fourth solder connections 116 and 118 connect leads 120 and 122 from the coil 84 (see FIG. 10) to leads 124 and 126 on the suspension.

Figure 7:
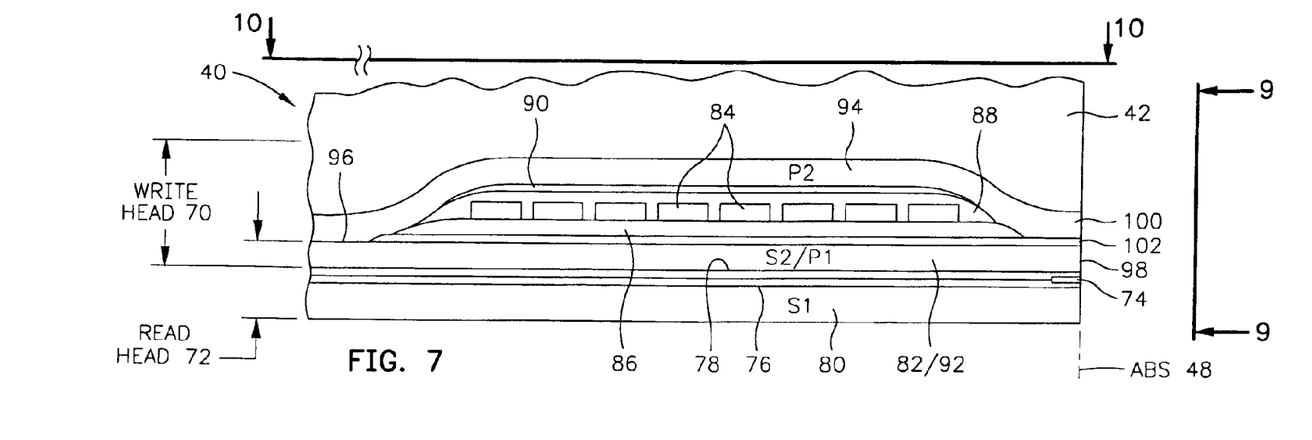
FIG. 7 is a partial view of the slider and a merged magnetic head as seen in plane 7—7 of FIG. 2.
Figure 9:
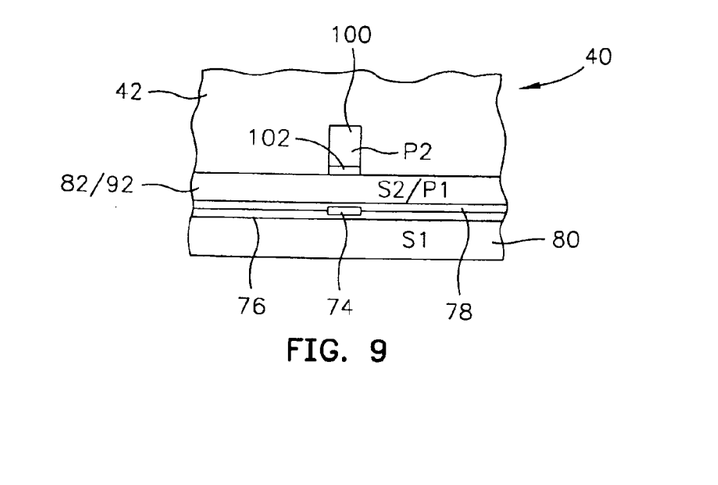
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
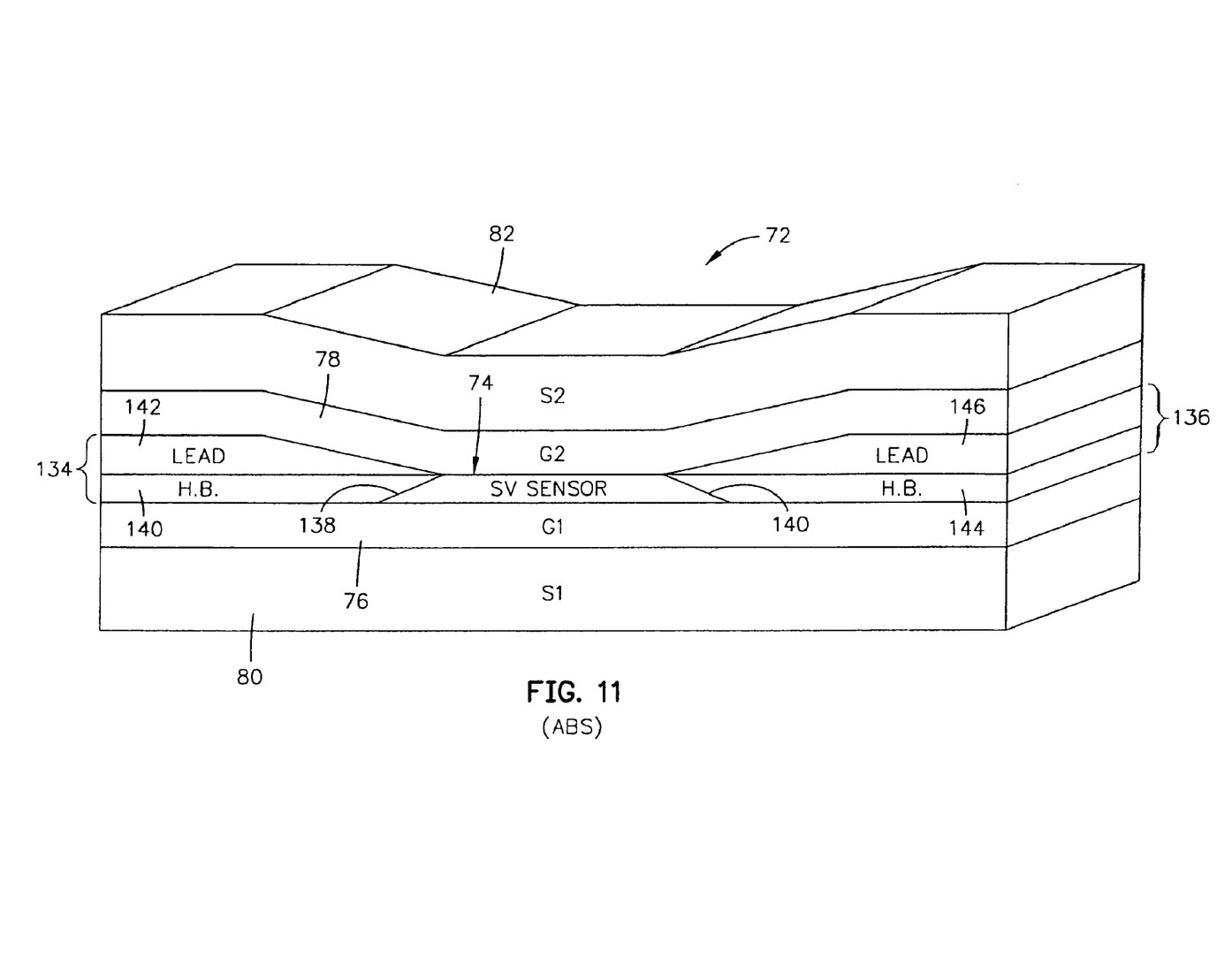
FIG. 11 is an enlarged isometric illustration of a read head which has a spin valve sensor.

FIG. 11 is an isometric ABS illustration of the read head 72 shown in FIGS. 6 or 8. The read head 72 includes the spin valve sensor 74. First and second hard bias and lead layers 134 and 136 are connected to first and second side edges 138 and 140 of the sensor. This connection is known in the art as a contiguous junction and is fully described in commonly assigned U.S. Pat. No. 5,018,037 which is incorporated by reference herein. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the sensor 74 for stabilizing the magnetic domains therein. The sensor 74 and the first and second hard bias and lead layers 134 and 136 are located between nonmagnetic electrically insulative first and second read gap layers 148 and 150. The first and second read gap layers 148 and 150 are, in turn, located between ferromagnetic first and second shield layers 152 and 154.

The gap length, which is the distance between the first and second shield layers 152 and 154 in FIG. 11, determines the linear bit read density of the read head. The linear bit density is quantified as bits per inch (BPI) which is the number of bits that can be read by the read head along an inch of a track on a rotating magnetic disk. The width of a free layer (not shown) in the sensor 74 defines the track width of the read head. The track width density is quantified as the number of tracks per inch (TPI) along a radius of the rotating magnetic disk. The product of the linear bit density and the track width density is the areal density of the read head. The higher the areal density, the higher the storage capacity of the magnetic disk drive.

In order to increase the linear bit density it is necessary to decrease the thicknesses of the first and second gap layers 148 and 150. When these gap layers are made thinner there is a risk of a pinhole in a gap layer which permits an electrostatic discharge (ESD) to occur between either of the first and second shield layers and the sensor 74 or either of the first and second lead layers 134 and 136. An ESD can destroy the spin valve sensor 74 rendering the read head inoperable. A charge can build up on either of the first and second shield layers 152 or 154 by human handling or contacting a charged object which is typically made of plastic. The risk of an ESD is primarily during fabrication of the magnetic head and mounting it on a magnetic disk drive. After mounted on a magnetic disk drive the risk of an ESD is minimal. In order to minimize ESD damage to the read sensor 74 the first and second shield layers 150 and 154 may be shorted to either of the lead layers 134 and 136. After assembly of the magnetic head on a magnetic disk drive the short may be deleted by severing a delete pad on the surface of the slider with a laser beam. Alternatively, the circuitry for the short may be lapped away at a row level of magnetic heads before dicing the row into individual heads and assembly on the magnetic disk drive. While a short between the first and second shield layers and either one of the first and second lead layers 134 and 136 minimizes ESD damage to the sensor 130, there has been no provision for determining the resistances of the first and second gap layers 148 and 150 and rejecting heads which have low resistances due to pinholes in either of the gap layers.

First Embodiment of the Invention

Figure 12:
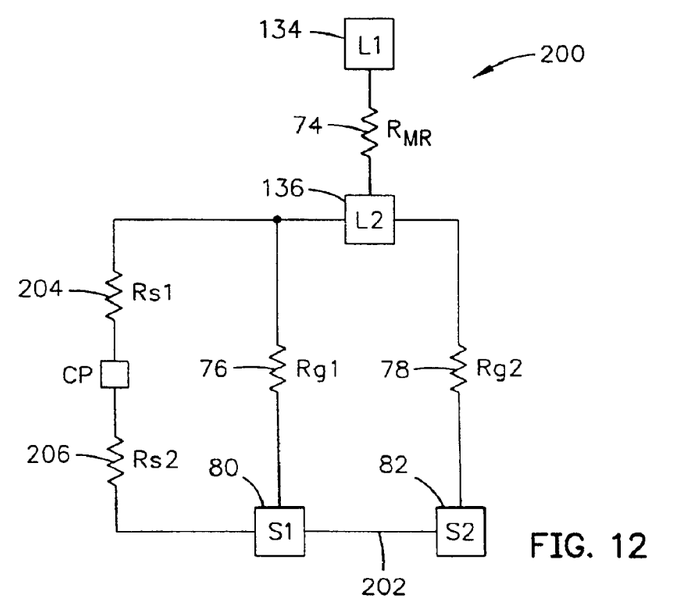
FIG. 12 is a circuit diagram of one embodiment of the present invention.

A first embodiment 200 of the present invention is shown in FIG. 12 which shows the first and second lead layers 134 and 136 (L1 and L2) connected to the read sensor 74. The sensor 74 is shown as having a resistance $R_{MR}$. FIG. 12 also shows the first and second shield layers S1 and S2 80 and 82 are shorted by a lead 202. First and second resistors 204 and 206 are connected across the second lead L2 and the first and second shield layers S1 and S2. With this arrangement the first read gap layer 76 has a resistance $R_{G1}$ between the shield layers S1 and S2 and the second lead L2 and the second read gap layer 78 has a resistance $R_{G2}$ between the shield layers S1 and S2 and the second lead L2. Alternatively, the first and second resistors 204 and 206 may be connected between the first and second shield layers S1 and S2 and the first lead layer L1. In this instance, the resistance $R_{G1}$ would be the resistance between the shield layers S1 and S2 and the first lead layer L1 and the resistance $R_{G2}$ would be the resistance between the shield layers S1 and S2 and the first lead layer L1. A center point (CP) is located between the first and second resistors 204 and 206 which will be discussed in more detail hereinafter.

Figure 13:
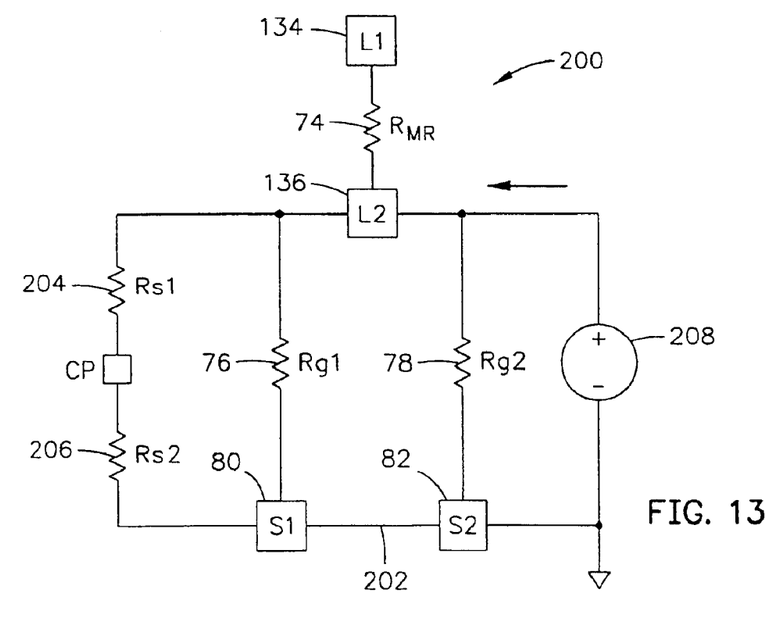
FIG. 13 is the same as FIG. 12 except a test instrument is employed to measure the combined parallel resistance of the first and second gap layers.

FIG. 13 is the same as FIG. 12 except a circuit tester 208 is connected across the first and second shield layers S1 and S2 and the second lead layer L2. The circuit tester 208 applies a predetermined voltage or a predetermined current and then reads the current or the voltage respectively. Assuming the circuit tester 208 applies a predetermined voltage and reads the current, then the resistance of the circuit, which is the parallel combination of $R_{S1}$ plus $R_{S2}$, $R_{G1}$ and $R_{G2}$, is the predetermined voltage divided by the current. It should be noted that no current flows through the sensor 74 since the first lead L1 is floating. The resistance value of the series combination $R_{S1}$ plus $R_{S2}$ can be made high enough so that it is roughly equal to or larger than any shield short of interest. Assuming, however, that the specification on shield shorts is 100 kOhm, a resistance that high may not offer sufficient protection from shield charging effects and would require a very long resistor. This problem is overcome in the second embodiment.

Second Embodiment of the Invention

Figure 14:
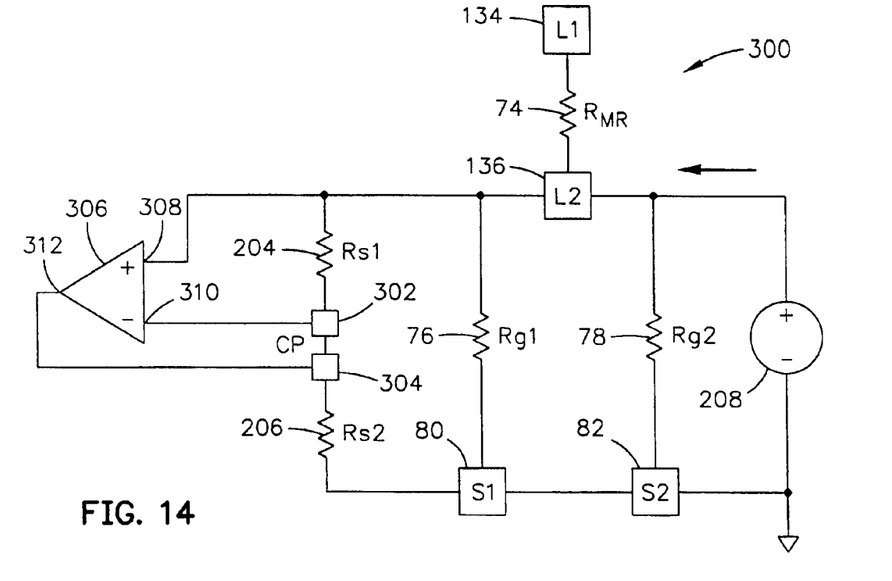
FIG. 14 is a circuit diagram of a second embodiment of the present invention with the test instrument measuring the combined parallel resistance of the first and second gap layers.

FIG. 14 illustrates a second embodiment 300 of the present invention which is an improvement over the first embodiment 200 in FIG. 13. The embodiment 300 is the same as the embodiment 200 except for the following. The center point (CP) has two separate connections 302 and 304. The second lead L2 can be considered as a first node in the circuit and the connection 302 can be considered as a second node. An operational amplifier 306 has a first input 308 connected to the second lead L2 (first node) and a second input 310 connected to the first contact 302 (second node). The output 312 of the operational amplifier is connected to the second contact 304 which is located between the first contact 302 and the second resistor 206. The operational amplifier 306, which is configured as a unity gain buffer, is adjusted so that it drives the center point (CP) between the resistors 204 and 206 to the same potential as the second lead L2 (first node). As a result, there is zero voltage drop across the first resistor 204, which means that no current will flow through the first resistor 204 nor through the second resistor 206. This means that all of the current from the circuit tester 208 will attempt to flow through the first and second gap layers 76 and 78. With this arrangement the first and second resistors 204 and 206 do not need to be equal.

Assuming that the circuit tester 208 applies 2 volts between the second lead L2 and the shield layers S1 and S2, the potential of the node at the center point (CP) will also rise to 2 volts. It is therefore helpful to make the second resistor 206 large enough so that it does not dissipate an excessive amount of power which could cause the second resistor 206 to melt. The value of the first resistor 204 is preferably smaller than the resistance of the second resistor 206 so that the series resistance $R_{S1}$ plus $R_{S2}$ is made as low as possible. It should be noted that the circuit tester 208 and the resistances 204 and 206 can optionally be connected to the first lead L1 instead of the second lead L2 in which instance the resistances $R_{G1}$ and $R_{G2}$ will be the resistances of the first and second gap layers 76 and 78 between the first lead layer L1 and the first and second shield layers S1 and S2. It should further be noted that in either instance that the embodiment shown in FIG. 14 does not enable a determination of the resistances $R_{G1}$ and $R_{G2}$ of the first and second gap layers 76 and 78 separately but, in contrast, measures these resistances in parallel, which parallel reading excludes the resistances $R_{S1}$ and $R_{S2}$ of the resistors 204 and 206 because of the operation of the operational amplifier 306.

Third Embodiment of the Invention

Figure 15:
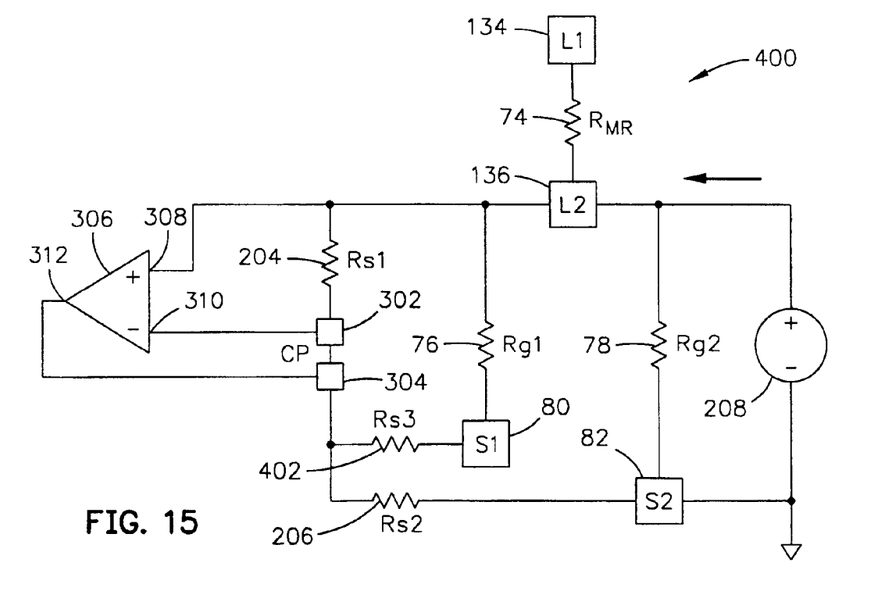
FIG. 15 is a circuit diagram of a third embodiment of the present invention with the test instrument measuring the resistance of only the first gap layer.
Figure 16:
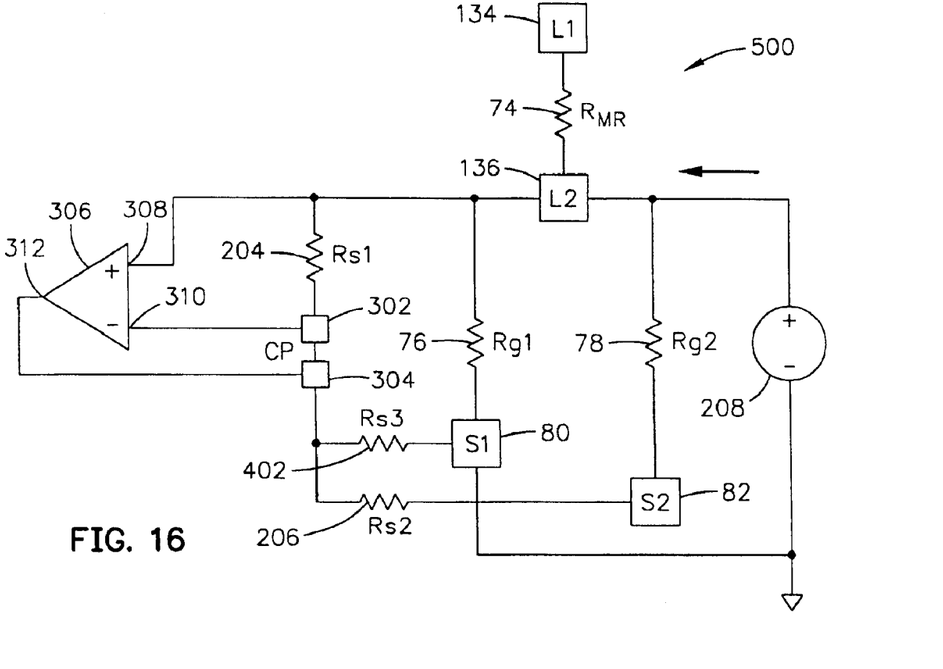
FIG. 16 is the same as FIG. 15 except that the test instrument is measuring the resistance of only the second gap layer.

FIG. 15 shows a third embodiment 400 of the present invention which can measure the resistances $R_{G1}$ and $R_{G2}$ of the first and second gap layers 76 and 78 separately and is therefore an improvement over the embodiment 300 in FIG. 14. The embodiment 400 is the same as the embodiment 300 in FIG. 14 except for the following. The first and second shield layers S1 and S2 are no longer shorted together and a third resistor 402 having a resistance $R_{S3}$ is connected between the center point (second node) and the first shield layer S1. The resistances $R_{G1}$ and $R_{G2}$ of the first and second gap layers 76 and 78 can now be determined separately. The resistance $R_{G2}$ of the second gap layer 78 can be determined when the circuit tester 208 is connected across the second shield layer S2 and the second lead layer L2. Optionally, the resistance $R_{G1}$ of the first read gap layer 76 can be determined by connecting the circuit tester 208 across the first shield layer S1 and the second lead layer L2, as shown in FIG. 16. Again, it should be understood that since there is no current through the first resistor 204 because of the operational amplifier 306 there is no current through either of the resistors 206 and 402. Further, in either of the arrangements in FIGS. 15 and 16, the first lead L1 is floating. It should be further understood that all of the connections can be made between the first lead L1 instead of the second lead L2, as discussed hereinabove.

A Method of Making

Figure 17:
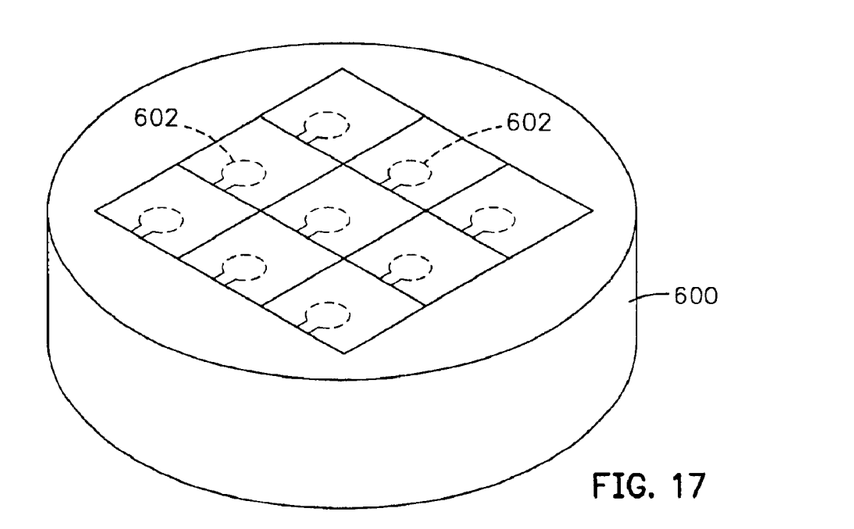
FIG. 17 is an isometric illustration of rows and columns of magnetic heads on a wafer substrate.

Another aspect of the present invention includes a method of making all of the aforementioned components. A still further aspect of the invention includes simultaneously patterning a sensor material layer for forming the sensor 74 and the resistors 204 and 206 or the resistors 204, 206 and 402. This may be accomplished by first depositing multiple films of the sensor 74 on a wafer, such as a wafer 500 in FIG. 17. The sensor material layer may then be patterned by a positive photoresist which covers the MR sensor and the resistors which are to be retained. Ion milling then removes all of the sensor material layer except that which is covered. The degree of covering the resistors determines their resistances. This then enables the MR sensor and the resistors to be simultaneously formed, thereby saving fabrication steps. It should be noted that when this method is employed that the sensor 74 and the resistors 204 and 206 or the resistors 204, 206 and 402 will be coplanar. FIG. 17 shows rows and columns of magnetic heads 502 formed thereon. After completion of the magnetic heads 502 the wafer is diced into rows of magnetic heads and the rows are lapped to form the air bearing surface.

Figure 18:
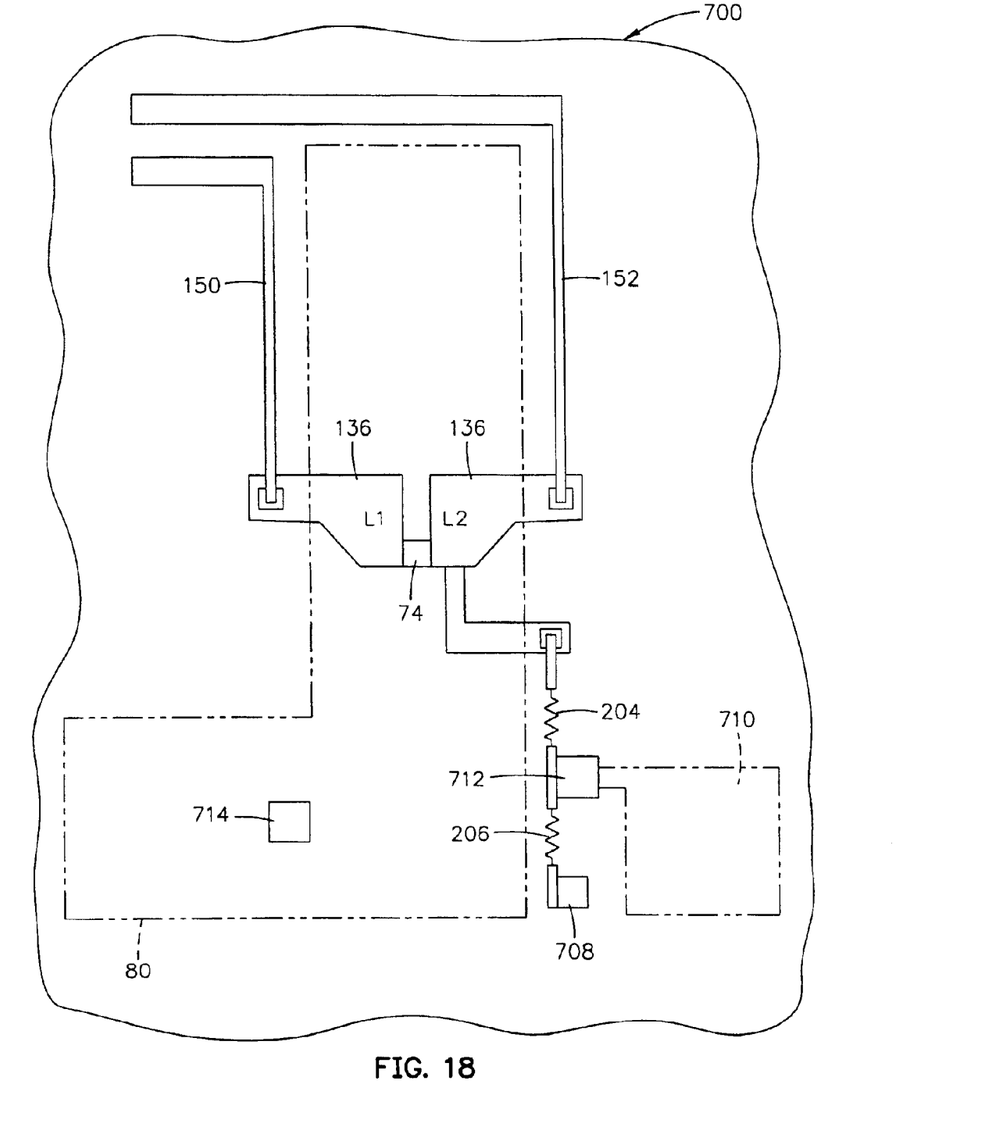
FIG. 18 is an exemplary plan layout of the embodiments shown in FIGS. 12, 13 and 14.

FIG. 18 shows an exemplary plan layout 700 of the embodiments shown in FIGS. 12, 13 and 14. Lead layers 134 and 136 are shown connected to the sensor 74 and first and second lead layer extensions 150 and 152 interconnect the first and second lead layers 134 and 136 to the pads 104 and 106, shown on the slider in FIG. 2, via first and second studs (not shown). The second lead layer 136 is connected to the first and second resistors 204 and 206 and the second resistor 206 is connected to the first shield layer 80 (see FIG. 14) by a via 708. A pad 710, which is shown in phantom, is located at the surface of the slider and is interconnected to the center point (CP) between the resistors by one or more vias at 712. The first shield layer 80, shown in phantom, is located below the sensor 74 and the first and second lead layers 134 and 136 and is separated therefrom by the first read gap layer 76. After the second gap layer 78 is deposited a via 714 is formed down to the first shield layer 80 so that when the second shield layer 82 is deposited on top of the second read gap layer 78 the first and second shield layers are interconnected. During subsequent fabrication of the head a stud is provided between the via 714 and a pad (not shown) at the surface of the slider. In practice the operational amplifier 306 is interconnected to the pad 710 and the circuit tester 208 is interconnected between the second lead layer extension 152 and the pad to the via 714. As discussed hereinabove, the sensor 74 and the first and second resistors 204 and 206 may be deposited simultaneously and patterned simultaneously. Alternatively, the sensor may be deposited and patterned separately and the first and second resistors 204 and 206 may be deposited simultaneously and patterned simultaneously. It should be understood that vias are simply holes in the structure that are filled with a conductive material such as copper. It should further be understood that in the embodiment shown in FIG. 18 that after lapping a row of magnetic heads all of the structure below an air bearing surface (ABS) of the sensor is removed. Alternatively, this structure may be on an opposite side of the sensor in which case one or more delete pads at the surface of the slider may be severed by a laser beam to disconnect critical portions of the test circuitry from the sensor.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a read head assembly comprising the steps of:

making a read head including the steps of:

forming a read sensor;

forming first and second lead layers with the first and second lead layers connected to the read sensor;

forming nonmagnetic insulative first and second read gap layers with the read sensor and the first and second lead layers located between the first and second read gap layers;

forming ferromagnetic first and second shield layers with the first and second read gap layers located between the first and second shield layers and the first read gap layer having a resistance $R_{G1}$ between the first shield layer and one of the first and second lead layers and the second read gap having resistance $R_{G2}$ between the second shield layer and said one of the first and second lead layers;

forming a connection via a plurality of resistors between a first node and each of the first and second shield layers wherein the plurality of resistors includes at least first and second resistors $R_{S1}$ and $R_{S2}$ the first node is connected to said one of the first and second lead layers and a second node is located between the first and second resistors $R_{S1}$ and $R_{S2}$ and     connecting first and second inputs of an operational amplifier to the first and second nodes respectively so as to be across the first resistor $R_{S1}$ and connecting an output of the operational amplifier to the second node for maintaining the first and second nodes at a common voltage potential.

2. A method of making as claimed in claim 1 including making the sensor and the first and second resistances $R_{S1}$ and $R_{S2}$ coplanar.

3. A method of making as claimed in claim 2 wherein the step of making the sensor and the first and second resistances $R_{S1}$ and $R_{S2}$ coplanar includes the steps of:

simultaneously depositing a single layer of material or the sensor and the first and second resistances $R_{S1}$ and $R_{S2}$ and simultaneously patterning said single layer of material to form the sensor and the first and second resistances $R_{S1}$ and $R_{S2}$.

4. A method of making as claimed in claim 1 including:

connecting a first side of a test instrument for enabling a determination of resistance to the first node and connecting a second side of the test instrument to at least one of the first and second shield layers.

5. A method of making as claimed in claim 4 including:

shorting the first and second shield layers together; and connecting the second side of the test instrument to each of the first and second shield layers.

6. A method of making as claimed in claim 5 including making the sensor and the first and second resistances $R_{S1}$ and $R_{S2}$ coplanar.

7. A method of making as claimed in claim 6 wherein a the step of making the sensor and the first and second resistances $R_{S1}$ and $R_{S2}$ coplanar includes the steps of:

simultaneously depositing a single layer of material for the sensor and the first and second resistances $R_{S1}$ and $R_{S2}$ and simultaneously patterning said single layer of material to form the sensor and the first and second resistances $R_{S1}$ and $R_{S2}$.

8. A method of making as claimed in claim 7 further comprising the steps of:

making a write head including the steps of:

forming ferromagnetic first and second pole piece layers with a yoke portion between a pole tip portion and a back gap portion;

forming a nonmagnetic write gap layer between the pole tip portions of the first and second pole piece layers;

forming an insulation stack with at least one coil layer embedded therein located between the yoke portions of the first and second pole piece layers; and connecting the first and second pole piece layers at their back gap portions.

9. A method of making as claimed in claim 8 wherein the second shield layer and the first pole piece layer are formed as a common layer.

10. A method of making as claimed in claim 8 wherein the second shield layer and the first pole piece layer are formed as separate layers; and forming a nonmagnetic insulative isolation layer between the second shield layer and the first pole piece layer.

11. A method of making as claimed in claim 1 including:

the second resistor $R_{S2}$ further being connected between the second node and the second shield layer; and connecting a third resistor $R_{S3}$ between the second node and the first shield layer.

12. A method of making as claimed in claim 11 including making the sensor and the first, second and third resistances $R_{S1}$ $R_{S2}$ and $R_{S3}$ coplanar.

13. A method of making as claimed in claim 12 wherein the step of making the sensor and the first, second and third resistances $R_{S1}$, $R_{S2}$ and $R_{S3}$ includes the steps of:

simultaneously depositing a single layer of material for the sensor and the first, second and third resistances $R_{S1}$ $R_{S2}$ and $R_{S3}$ and simultaneously patterning said single layer of material to form the sensor and the first, second and third resistances $R_{S1}$ $R_{S2}$ and $R_{S3}$.

14. A method of making as claimed in claim 11 including:

connecting a first side of a test instrument for enabling a determination of resistance to the first node and connecting a second side of the test instrument to the first shield layer.

15. A method of making as claimed in claim 14 including making the sensor and the first, second and third resistances $R_{S1}$ $R_{S2}$ and $R_{S3}$ coplanar.

16. A method of making as claimed in claim 15 wherein the step of making the sensor and the first, second and third resistances $R_{S1}$ $R_{S2}$ and $R_{S3}$ includes the steps of:

simultaneously depositing a single layer of material for the sensor and the first, second and third resistances $R_{S1}$ $R_{S2}$ and $R_{S3}$ and simultaneously patterning said single layer of material to form the sensor and the first, second and third resistances $R_1$ $R_2$ and $R_3$.

17. A method of making as claimed in claim 16 wherein the second shield layer and the first pole piece layer are formed as a common layer.

18. A method of making as claimed in claim 16 wherein the second shield layer and the first pole piece layer are formed as separate layers; and forming a nonmagnetic insulative isolation layer between the second shield layer and the first pole piece layer.

19. A method of making as claimed in claim 11 including:

connecting a first side of a test instrument for enabling a determination of resistance to the first node and connecting a second side of the test instrument to the second shield layer.

20. A method of making as claimed in claim 19 including making the sensor and the first, second and third resistances $R_{S1}$ $R_{S2}$ and $R_{S3}$ coplanar.

21. A method of making as claimed in claim 20 wherein the step of making the sensor and the first, second and third resistances $R_{S1}$ $R_{S2}$ and $R_{S3}$ includes the steps of:

simultaneously depositing a single layer of material or the sensor and the first, second and third resistances $R_{S1}$ $R_{S2}$ and $R_{S3}$ and simultaneously patterning said single layer of material to form the sensor and the first, second and third resistances $R_{S1}$ $R_{S2}$ and $R_{S3}$.

22. A method of as claimed in claim 21 wherein the second shield layer and the first pole piece layer are formed as a common layer.

23. A method of making as claimed in claim 21 wherein the second shield layer and the first pole piece layer are farmed as separate layers; and forming a nonmagnetic insulative isolation layer between the second shield layer and the first pole piece layer.

* * * * *